US009185471B2

United States Patent
Bolocan (10) Patent No.: US 9,185,471 B2
(45) Date of Patent: *Nov. 10, 2015

(54) METHOD AND APPARATUS FOR DETECTING ONE OR MORE PREDETERMINED TONES TRANSMITTED OVER A COMMUNICATION NETWORK

(71) Applicant: Bogdan Bolocan, Sinaia (RO)

(72) Inventor: Bogdan Bolocan, Sinaia (RO)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/448,280

(22) Filed: Jul. 31, 2014

(65) Prior Publication Data

US 2014/0341214 A1 Nov. 20, 2014

Related U.S. Application Data

(62) Division of application No. 13/003,311, filed as application No. PCT/IB2008/052843 on Jul. 16, 2008, now Pat. No. 8,804,700.

(51) Int. Cl.
- *H04L 12/66* (2006.01)
- *H04Q 1/457* (2006.01)
- *H04M 7/00* (2006.01)

(52) U.S. Cl.
CPC ............ *H04Q 1/4575* (2013.01); *H04M 7/0069* (2013.01)

(58) Field of Classification Search
USPC .................................................. 370/352, 17
See application file for complete search history.

(56) References Cited

U.S. PATENT DOCUMENTS

| | | | | |
|---|---|---|---|---|
| 3,639,703 A | * | 2/1972 | Bergemann et al. | 324/76.31 |
| 3,780,230 A | * | 12/1973 | Bowen et al. | 340/13.34 |
| 3,955,051 A | * | 5/1976 | Bitzer et al. | 379/93.17 |
| 3,991,419 A | * | 11/1976 | Thomas | 455/306 |
| 4,227,055 A | * | 10/1980 | Hanson | 702/70 |
| 4,421,952 A | * | 12/1983 | Barnes | 455/463 |
| 4,979,211 A | * | 12/1990 | Benvenuto et al. | 704/251 |
| 5,001,757 A | * | 3/1991 | Field et al. | 381/13 |

(Continued)

FOREIGN PATENT DOCUMENTS

EP 1395065 A1 3/2004

OTHER PUBLICATIONS

International Telecommunication Union: "Series V: Data Communication Over the Telephone-Network-Interworking with Other Networks—Procedures for Supporting Voice-Band Data Over IP Networks," ITU-T v. 152, Jan. 2005, Switzerland, Geneva; pp. 1-34.

*Primary Examiner* — Edan Orgad
*Assistant Examiner* — Emmanuel Maglo (57) ABSTRACT

A gateway includes a network interface and an apparatus for detecting predetermined tones The apparatus includes an input to receive a signal transmitted over the network interface, a frequency divider to divide the signal into two different components, each component being associated with a different frequency sub band, wherein each frequency sub band is selected to include a predetermined frequency of a predetermined tone, a frequency discriminator to determine frequencies of tones in the components, and a decision logic block to provide an indication that a first predetermined tone has been detected when a first determined frequency of a first tone in a first component corresponds to a first predetermined frequency of the first tone.

20 Claims, 5 Drawing Sheets

(56) References Cited

U.S. PATENT DOCUMENTS

| | | | |
|---|---|---|---|
| 5,134,646 A * | 7/1992 | Carlson | 379/88.2 |
| 5,220,683 A * | 6/1993 | Rudish | 455/146 |
| 5,295,223 A * | 3/1994 | Saito | 704/214 |
| 5,307,029 A * | 4/1994 | Schenk | 331/37 |
| 5,587,810 A * | 12/1996 | Feldman | 358/442 |
| 5,603,088 A * | 2/1997 | Gorday et al. | 455/67.13 |
| 5,694,517 A * | 12/1997 | Sugino et al. | 704/213 |
| 5,796,815 A * | 8/1998 | Guercio et al. | 379/372 |
| 5,805,634 A * | 9/1998 | Sumner | 375/146 |
| 6,101,257 A * | 8/2000 | Lubbe et al. | 381/101 |
| 6,333,940 B1 * | 12/2001 | Baydar et al. | 370/506 |
| 6,363,125 B1 * | 3/2002 | Brankovic | 375/330 |
| 6,373,941 B1 * | 4/2002 | Kwon | 379/361 |
| 6,507,310 B2 | 1/2003 | Takase et al. | |
| 6,650,662 B1 * | 11/2003 | Arnaud et al. | 370/526 |
| 6,708,146 B1 | 3/2004 | Sewall et al. | |
| 6,868,116 B2 * | 3/2005 | Ahmad | 375/222 |
| 6,925,106 B2 | 8/2005 | Horaguchi et al. | |
| 6,967,946 B1 * | 11/2005 | Tackin et al. | 370/352 |
| 7,003,093 B2 | 2/2006 | Prabhu et al. | |
| 7,170,342 B2 | 1/2007 | Suzuki et al. | |
| 7,242,762 B2 | 7/2007 | He et al. | |
| 7,349,362 B2 * | 3/2008 | Belcea | 370/321 |
| 7,902,922 B2 | 3/2011 | Suzuki et al. | |
| 7,991,370 B2 * | 8/2011 | Kabashima et al. | 455/188.1 |
| 8,094,583 B2 * | 1/2012 | Parker et al. | 370/254 |
| 8,107,900 B2 * | 1/2012 | Seki et al. | 455/114.2 |
| 8,396,434 B2 * | 3/2013 | Kamata et al. | 455/127.1 |
| 8,804,700 B2 * | 8/2014 | Bolocan | 370/352 |
| 2002/0097860 A1 | 7/2002 | Soman et al. | |
| 2004/0162115 A1 * | 8/2004 | Smith et al. | 455/562.1 |
| 2004/0218548 A1 * | 11/2004 | Kennedy et al. | 370/254 |
| 2004/0228471 A1 | 11/2004 | Picha | |
| 2005/0073964 A1 * | 4/2005 | Schmidt et al. | 370/260 |
| 2005/0100121 A1 | 5/2005 | Fouret et al. | |
| 2005/0105716 A1 * | 5/2005 | Das et al. | 379/376.02 |
| 2005/0215219 A1 | 9/2005 | Khorram | |
| 2006/0109976 A1 | 5/2006 | Sundaram et al. | |
| 2006/0133358 A1 * | 6/2006 | Li et al. | 370/352 |
| 2008/0117898 A1 * | 5/2008 | Davidson et al. | 370/389 |
| 2008/0170513 A1 * | 7/2008 | Niranjan et al. | 370/256 |
| 2008/0298251 A1 * | 12/2008 | Khuu et al. | 370/238 |
| 2010/0254312 A1 * | 10/2010 | Kennedy | 370/328 |
| 2011/0032927 A1 | 2/2011 | Chen et al. | |

\* cited by examiner

METHOD AND APPARATUS FOR DETECTING ONE OR MORE PREDETERMINED TONES TRANSMITTED OVER A COMMUNICATION NETWORK

RELATED APPLICATION(S)

This application is a divisional of U.S. patent application Ser. No. 13/003,311, entitled "METHOD AND APPARATUS FOR DETECTING ONE OR MORE PREDETERMINED TONES TRANSMITTED OVER A COMMUNICATION NETWORK," filed on Jan. 10, 2011, which is a National Stage Entry under 37 C.F.R. §371 of PCT/IB2008/052843, filed Jul. 16, 2008, the disclosures of which are hereby expressly incorporated by reference in their entirety.

DESCRIPTION

1. Field of the Invention

This invention relates to a method and apparatus for detecting one or more predetermined tones transmitted over a communication network.

2. Background of the Invention

As the number of communication networks such as PSTN, ATM networks, IP networks or PBX increases and with the desire to be able to communicate between the different communication networks, a unit known as a media gateway unit has been developed that acts as a translation unit with communication (such as voice or data calls) from one communication network being connected to another communication network through the media gateway unit. The media gateway unit performs a conversion between the different transmission and coding techniques of the different communication networks. Thus, for example, a data call from a data modem in an IP network would connect to a data modem in the PSTN network through a media gateway unit and the media gateway unit converts the data signals between their state in the IP network and the state required for transmission over the PSTN network.

The media gateway unit can operate in a number of different modes depending on which networks are to be connected through the media gateway unit. For example, for a data call between an IP network and a PSTN network, the media gateway unit switches to a mode in which encoded data from the IP network is decoded and then sent to the PSTN network and vice versa.

In communication networks supporting speech or voice communication, such as PSTN or IP, devices such as CODECs, vocoders, echo suppressors and echo cancellers are used in the network to perform telephone processing functions for speech or voice signals. For example, echo cancellers are used to reduce and attempt to eliminate echoes formed when a speech signal from a user coupled to a local subscriber loop at one end traverses the PSTN to a user coupled to a local subscriber loop at another end. In such networks, a voice connection can also be used for data transmission (e.g. between a modem, facsimile, etc.) and the data transmitted over a voice connection is known as voiceband data. The signal characteristics are however different for voice and voiceband data and transmitting them requires different approaches. For example, for data communication between data enabled devices (e.g. data modems), over a network which support voice communication (for example, one modem being part of a PSTN and another to an IP network), as the data signal is passed through the vocoders in the PSTN or IP network, the data signal becomes distorted and the modems cannot communicate: the low bit-rate vocoders (e.g. G.723.1, G.729) commonly used for voice transmission in IP networks are designed and focused to handle voice signals and do not provide a reliable method for transmitting data.

Several mechanisms are used to improve the reliability of the transmission of voiceband data (VBD) and one of the simplest, known as the VBD switch, when the media gateway unit switches to a VBD mode, is to detect the voiceband data and to then bypass the vocoder processing. The mode of the media gateway unit is determined by signalling or set up information received at the media gateway unit such as PSTN signalling information, IP signalling information or modem or fax tones.

The switching of the media gateway unit to a mode may trigger certain events in the media gateway unit. Thus, when the media gateway unit determines from the signalling or set up information that a data call is to be made across a communication network supporting voice and data services, such as a PSTN network, the media gateway unit switches mode to the VBD mode and on entering that mode an event is triggered to disable the voice processing devices in the PSTN network, such as the echo cancellers, so that the data signal is not distorted. Similarly, for data communication through the media gateway unit and over an IP network, when the media gateway unit determines from the signalling or set up information that a data call is to be made across an IP network, the media gateway unit switches mode and on entering that mode an event is triggered to disable the IP vocoder which encodes the data according to the IP protocol so that uncoded data may be passed through the media gateway unit.

In order to detect that data communication has been initiated, the media gateway unit typically comprises a module which detects when a data communication has been initiated over a communication network, e.g. when a modem connects to a PSTN line and tries to communicate, and depending on the output of the module the media gateway unit is arranged to trigger certain events e.g. disable the echo cancellers and suppressors or IP vocoders. This is achieved by the module being arranged to detect a certain type of set up signal which is used to initiate data communication and which is typically known as a tone. Fax/modem tones for initiating data communications are defined in ITU standards such as V.21, V.22/V.22bis, V.23, V.27, V.29, V.17, V.32/V.32bis, V.34, V.34 HD, V.90, V.92, Bell standards such as Bell 202, Bell 212 and Security Industry Association (SIA) standards such as SIA DC-02, SIA DC-05.

For example, the answer tone signals ANS, ANSam sent by an answering device are defined by ITU standards, ITU-T V.8 and ITU-T V.25, and in a basic form the answer tone signal is a single continuous tone with a frequency of 2100 Hz±15 Hz and a duration of 3.3±0.7 seconds. As described in these ITU standards, the answer tone may include 180° phase reversals at predetermined intervals, such as 425 to 475 ms, which is used by the media gateway unit to disable network echo cancellers.

U.S. Pat. No. 7,003,093 describes a tone detection processor which discriminates between tone and voice signals and determines the tones. The tone detection processor performs automatic gain control (AGC) to normalize the power of the tone or voice signal. Further, the energy of the tone or voice signals are determined at specific frequencies utilizing a Goertzel Filter process which implements a plurality of Goertzel filters. The tone detection processor determines whether or not a tone is present from the two maximum energy levels of the Goertzel filtered tone and if a tone exits, determines the type of tone. However, the tone detection method described in this patent is not very accurate since it only uses a Goertzel Filter process. This means that a high (approx 100%) Call Connect Reliability (CCR) for all standard types of telephone lines (EIA 1-7, ETSI1 and ETSI2) is not achievable. In addition, additional processing overhead is required by the use of AGC.

In addition to all the different tones defined by the different standards, different data enabled devices from different manufacturers for a particular standard will generate different versions of the tones defined in the standard. This is due to the different designs and components used in the devices. For example, in the case of devices designed to generate the ANS tone, some devices will generate 'cleaner' (e.g. with less noise) ANS tones than other devices.

Typically, current tone detection modules are designed to detected only one tone or more than one tone when the tones occur at the same time, e.g. in the case when a normal transmitted tone from one modem occurs at the same time as the echo of the other modem's signal, the current detection modules will detect both tones. However, if the media gateway unit receives a tone for which the tone detection module is not designed to receive, the tone will go undetected and the data connection will fail.

Some tone detection modules are designed based on simulated data and do not take account of affects that arise when the modules are used in real life situations. For example, attenuation effects and cross-talk noise produced by subscriber lines between the device and the media gateway unit can distort the tone to such an extent that when it is processed by the tone detection module, the tone is not detected and the data connection will fail.

European patent application no. EP-A-1395065 describes a tone detector for detecting multicomponent DTMF tones for various tone formats. The method described in this patent application uses comb filters tuned to a particular frequency in order to have a single frequency for each of the AM-FM demodulators. Teager-Kaiser energy operators are then used for AM-FM discrimination. The method described is very sensitive to noise and distortions and so the detection reliability will drop significantly. Furthermore, since a multiple adaptation mechanism is used, the detection method described in this application is significantly slow. U.S. Pat. No. 7,242,762 describes a similar tone detection method.

U.S. Pat. No. 6,708,146 describes a voiceband signal classifier which determines which class of voiceband traffic is being carried by a connection over a communication network. The voiceband classes may include idle channels, voice signals, and voiceband data signals such as modem and fax signals. The method disclosed in this patent uses an autocorrelation method, probability density functions and other signal processing techniques and is focused on classifying traffic once an ongoing modulated connection has been set-up in order to discriminate the type of connection. In view of the time the method described in this patent requires to discriminate the ongoing call, such a method is not suitable for detecting tone set-up signals which requires the tone to be detected and the mode switched prior to the actual transmission of data, which may be in the range of 50-100 ms for V.22 fast-connect, otherwise the connection will fail. The amount of time required to detect the tone and switch to VBD in order to still have a successful connection varies. It can be as low as 50-100 ms for V.22 fast-connect and it can be as large as seconds (2-3 seconds) for V.32, V.34, V.90, V.92 (all the modem connections starting with either ANS or ANSam).

SUMMARY OF THE INVENTION

The present invention provides a method and apparatus for detecting one or more tones transmitted over a communication network as described in the accompanying claims.

Specific embodiments of the invention are set forth in the dependent claims.

These and other aspects of the disclosure will be apparent from and elucidated with reference to the embodiments described hereinafter.

BRIEF DESCRIPTION OF THE DRAWINGS

Further details, aspects and embodiments of the disclosure will be described, by way of example only, with reference to the drawings. Elements in the figures are illustrated for simplicity and clarity and have not necessarily been drawn to scale.

DETAILED DESCRIPTION OF THE DRAWINGS

The present invention will be described with reference to detecting one or more tones. However, it will be appreciated that the present invention may be used to detect any set up or handshake signals for data communication, including a fax tone, Call Tone (CT), V.32 AA tone and similar set up signals in, for example, any packet based telephony media gateway unit or similar apparatus.

Figure 1:
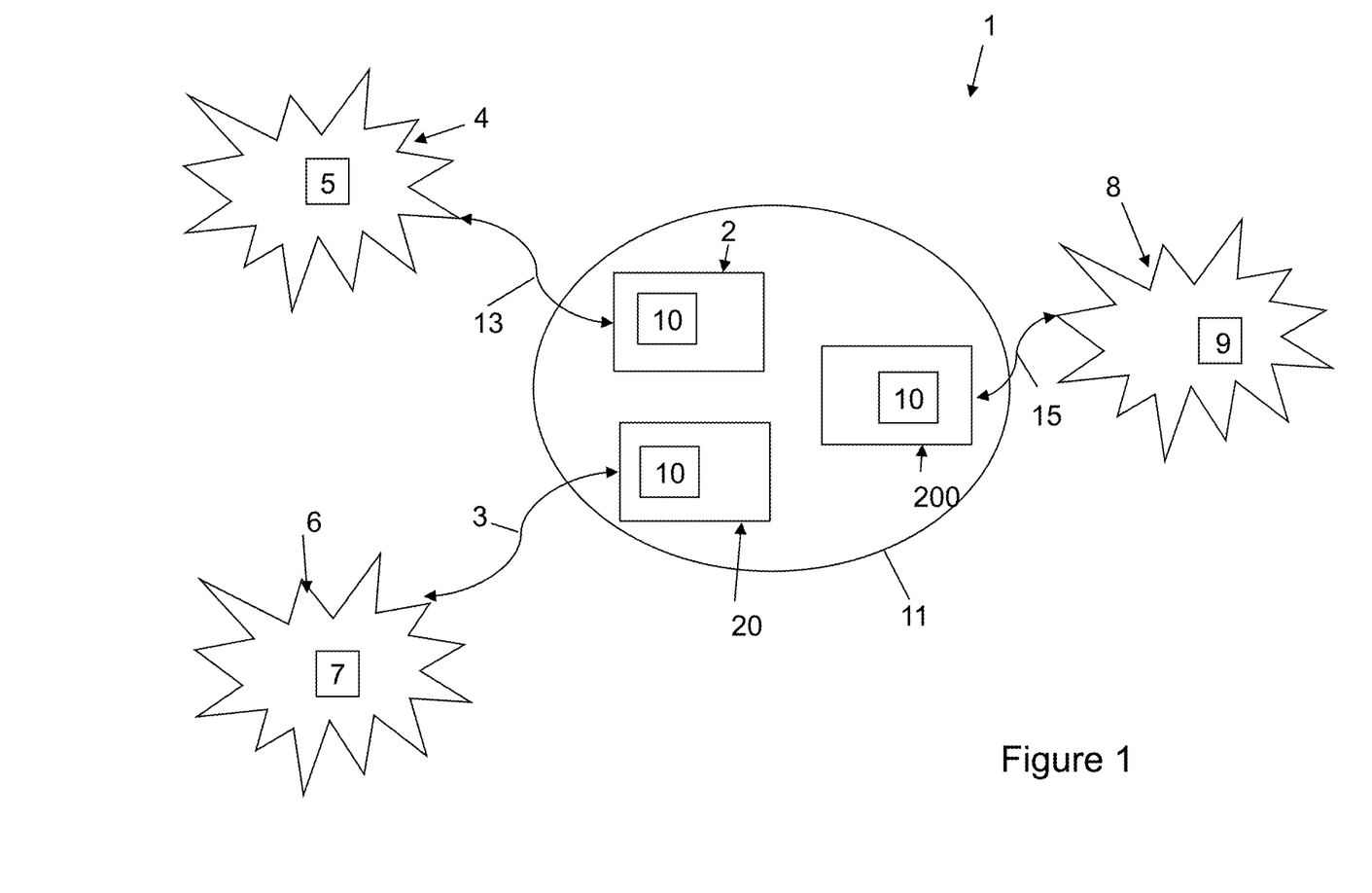
FIG. 1 is a block schematic diagram of a communication system comprising a plurality of communication networks connected by a plurality of media gateway units, each of the media gateway units including apparatus for detecting one or more tones in accordance with an embodiment of the disclosure.

Referring firstly to FIG. 1, a communication system 1 comprises a plurality of communication networks, including for example a private branch exchange (PBX) network 4, an IP network 6 and a PSTN network 8, and a plurality of media gateway units 2 for connecting the plurality of communication networks 4, 6, 8 and enabling communication between the different networks over communication links 3, 13 and 15. The plurality of media gateway units 2, 20, 200 may be part of a communication network 11, such as an IP network, and thus, the plurality of media gateway units 2 communicate with each other as necessary via the IP network 11. Each communication network 4, 6, 8 supports data communication from data devices or data enabled devices: for the PBX network 4, the data devices 5 may include data modems, facsimile devices; for the IP network 6, the data devices 7 may include IP video phones, computers; and for the PSTN network 8, the data devices 9 may include Digital Subscriber Line (DSL) modems or facsimile devices, ATMs. The data communicated over the networks 4, 6, 8 may include video, voice, SMS, email, multimedia or other types of data. In an alternative arrangement (not shown), a single media gateway unit may connect the plurality of communication networks 4, 6, 8 via a plurality of channels (not shown) and enable communication between the different networks.

Each media gateway unit 2, 20, 200 typically comprises a media gateway controller (not shown) and an apparatus 10 for detecting one or more tones in accordance with an embodiment of the disclosure. The apparatus 10 may be part of the media gateway controller or separate to the media gateway controller. Although the apparatus 10 will be described as being part of the media gateway unit 2, 20, 200, it will be appreciate that the apparatus 10 may, additionally or alternatively, be part of a data device in a network such as a fax/modem relay. In the case when the apparatus 10 is part of a data device, it may be used to detect an answer tone signal from another data device in the same or different communication networks so that data communication can be set up between the two data devices.

Figure 2:
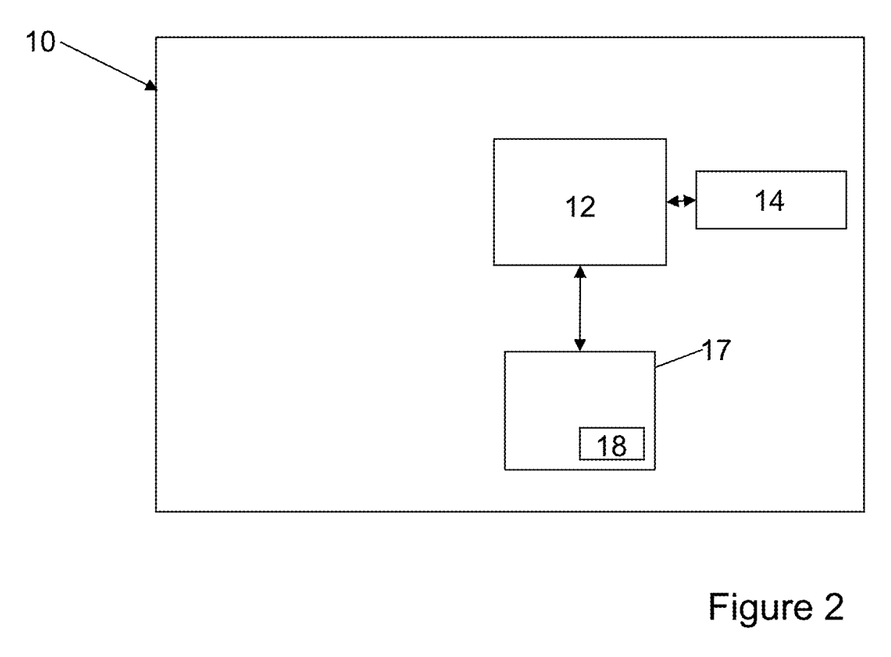
FIG. 2 is a block schematic diagram of an apparatus for detecting one or more tones in accordance with an embodiment of the disclosure.

In an embodiment shown in FIG. 2, the apparatus 10 comprises a processing unit 12, data memory 14 and program memory 17. The processing unit 12 may be a single processor, such as the StarCore DSP device supplied by Freescale Semiconductor, Inc. or may comprise two or more processors. The number of processors and the allocation of processing functions to the processors is a matter of design choice for a skilled person. The program memory 17 of the apparatus 10 stores programs containing processor instructions for operation of the processing unit 12. The programs may contain a number of different program elements or sub-routines containing processor instructions for a variety of different tasks. Specific program elements stored in program memory 17 include a tone detection program element 18. More details of the operation of this tone detection program element 18 will be described below.

To illustrate the operation of the communication system 1, lets consider the situation when a data modem in the IP network 6 connects to a data modem in the PSTN network 8 to exchange data, with the data modem 7 in the IP network 6 being the originator of the data exchange (or caller side) and the data modem 9 in the PSTN network 8 being the terminator of the data exchange (or answer side). The communication path is routed through the media gateway unit 20 connected to the IP network 6 and through the media gateway unit 200 connected to the PSTN network 8. The initial transmission sequence consists of the originator modem 7 sending a set up signal named Call Tone signal CT (CT 300 at −13 dBm0 (power in dBm measured at a zero transmission level point) in FIG. 3), and the terminator modem 9 detecting this set up signal and responding with a set up signal named answer tone signal ANSam (ANSam 302 at −18 dBm0 in FIG. 3). In the embodiment shown in FIG. 3, a further handshake signal (V.32AA 304 at −13 dBm0 in FIG. 3) is then sent by the originating modem 7. This further signal is sent by the originating modem and provides the last chance of having a successful connection. Failure to detect the beginning of this tone will result in a failed modem connection. Usually, the signals transmitted over the IP network 6 are coded using low-bit vocoders which are designed for handling voice signals. The media gateway unit 20 receives the signals from the IP network 6 and decodes them according to the vocoder type into a linear (uncoded) format, or low-compression formats like G.711, A-law, or μ-law. The signals received from PSTN network 8 that are to be sent to the IP network 6 will be first encoded by the media gateway unit 200 using one of the above mentioned low-bit vocoders and sent to the IP network 6 in a coded format.

When a CT signal 300 is generated by the originator modem 7, the apparatus 10 in the media gateway unit 20 receives a signal from the originator modem 7 and by means of the tone detection program element 18, attempts to detect the CT signal 300. If the CT signal 300 is detected, the tone detection program element 18 notifies the media gateway unit 20 that the connected party from the IP network 6 generated a CT signal and thus identifies it as being an originator modem of a data call. The media gateway unit 20 will then disable the low-bit vocoders so that uncoded data may be passed through the media gateway unit 20. The media gateway unit 200 will receive an echo of the CT signal 300, at for example −29 dBm0, which echo signal is represented by the signal 301 in FIG. 3. When an answer tone signal ANSam 302 is generated by the terminator modem 9, the apparatus 10 in the media gateway unit 200 receives a signal from the terminator modem 7 and by means of the tone detection program element 18, attempts to detect the ANSam signal 302. If the ANSam signal 302 is detected, the tone detection program element 18 notifies the media gateway unit 200 that the connected party from the PSTN network 8 generated an answer tone signal ANSam and thus identifies it as being a terminator modem 9. The media gateway unit 200 will then switch mode to suppress encoding the signal and send it from now on in a linear (uncoded) format or low-compression formats like G.711, A-law, or μ-law. Since the set up signal from the terminator modem 9 is a ANSam signal with phase reversals, the apparatus 10 in the media gateway unit 200 is arranged to detect the phase reversal(s) and if detected, will notify the media gateway unit 200 to disable its built-in echo canceller (not shown). The media gateway unit 20 receives an echo of the ANSam signal 302, at for example −38 dBm0, which echo signal is represented by the signal 303 in FIG. 3.

Figure 3:
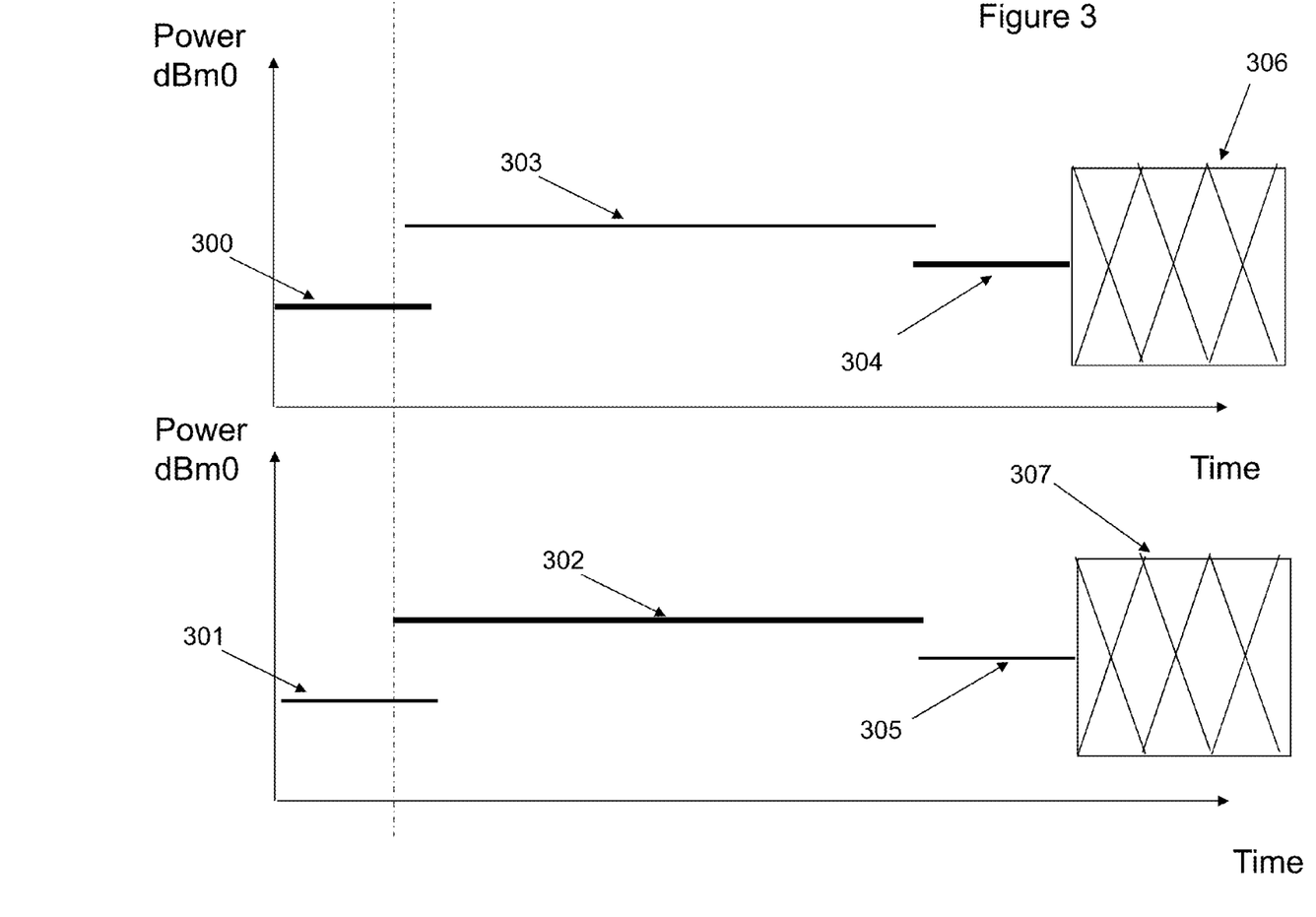
FIG. 3 is a graphical representation showing examples of different tones that may be received on initiation of data communications between two of the communication units of FIG. 1.

The media gateway units 20, 200 may switch modes in response to detecting a certain tone and/or in response to receiving a switch signal from another gateway unit depending on the particular situation. For example, in the situation where media gateway unit 20 is a low quality unit which won't detect CT signal 300 and cannot detect signal 303 since it is an echo, media gateway unit 200 might detect the echo signal 301 of the CT signal if its level is above a lowest threshold. Otherwise, media gateway unit 200 will detect the ANSam signal 302 and will switch modes so as to suppress the encoding. The media gateway unit 200 will then start sending a switch signal (e.g. VBD packets) over the IP network to the media gateway unit 20. Thus, the media gateway unit 20 will be informed to switch modes by the media gateway unit 200 sending a switch signal over the IP network which connects them and the connection will proceed as it should. In the situation where media gateway unit 20 detects a CT signal 300, the unit 20 will switch and will send a switch signal to notify the other media gateway unit 200 of the switch through the IP network which connects them. Then the media gateway unit 200 will switch as well either by receiving the switch signal from unit 20 or after the detection of ANSam signal 302 on its side.

When a V.32AA handshake signal 304 is generated by the originator modem 7, the apparatus 10 in the media gateway unit 20 receives a signal from the originator modem 7 and by means of the tone detection program element 18, attempts to detect the V.32 AA signal 304. If the V.32 AA signal 304 is detected, the tone detection program element 18 notifies the media gateway unit 20 that the connected party from the IP network 6 initiated a data call. The media gateway unit 20 will then switch mode to disable the low-bit vocoders so that uncoded data may be passed through the media gateway unit 20. The media gateway unit 200 will receive an echo of the V.32 AA signal 304, at for example −27 dBm0, which echo signal is represented by the signal 305 in FIG. 3.

In an embodiment of the disclosure, as will be described in more detail below, the tone detection program elements 18 in each of the media gateway units 20, 200 are further arranged to detect the echo signals 301 and 303.

Thus, in response to detecting at least one of the CT signal 300, the V.32 AA signal 304, and the echo 303 of the ANSam signal 302 by the media gateway unit 20 and at least one of the ANSam signal 302 and the echos 301, 305 of the CT signal 300 and the V.32 AA signal 304 by the media gateway unit 200, the mode of the media gateway units 20 and 200 can be switched to a mode in which the speech vocoders and echo cancellers are disabled (e.g. to VBD mode) before the terminator modem 9 or originator modem 7 begins transmitting data represented by 307 (for modem 9) and 306 (for modem 7) in FIG. 3. When both of the media gateway units 20 and 200 have switched modes, the data devices 7 and 9 can communicate uncoded data directly.

A method and apparatus for detecting one or more predetermined tones or set up or handshake signals in accordance with an embodiment of the disclosure will now be described with further reference to FIG. 4. The processing unit 12 of apparatus 10 receives a signal at an input 16 of a signal processing block 400 and processes the received signal according to the tone detection program element 18. The received signal is in a linear format following decoding in the media gateway unit 2, 20, 200. In an embodiment, the received signal includes a 16 bit linear PCM data word sampled at 8 kHz and the processing unit 12 processes the received signal in 10 ms frames: that is, the received signal comprises a plurality of frames each of 10 ms duration. The processing block 400 processes the received signal and outputs information, including frequency information, for detecting predetermined tones.

Broadly, a method for detecting one or more predetermined tones transmitted over a communication network in accordance with an embodiment of the disclosure comprises dividing a received signal into at least two frequency sub bands to provide at least two components of the received signal in different frequency sub bands, and determining a frequency of each tone in the at least two components and providing an indication that a predetermined tone has been detected when the determined frequency of a tone in a component corresponds to the predetermined frequency of one of the one or more predetermined tones. The frequency sub bands are selected based on the predetermined frequencies of the one or more predetermined tones to be detected. In an embodiment, the received signal is divided by at least two filters to provided at least two filtered components of the received signal. Each of the at least two filters has a passband which is different to the passband of the other of the at least two filters. The passbands of the at least two filters are selected based on the predetermined frequencies of the one or more predetermined tones.

In an embodiment, when at least one predetermined tone has been detected, an indication is provided that the at least one detected predetermined tone is valid when the at least one detected predetermined tone satisfies a rule. For example, the rule may include a list of valid combinations of predetermined tones. In a situation, when at least one predetermined tone has been detected, the at least one detected predetermined tone is indicated as valid when the combination of the at least one detected predetermined tone corresponds to a valid combination in the list. A valid combination may include a predetermined sequence of at least two predetermined tones.

In another embodiment, the power of the received signal is adjusted by an adjustment block 402 prior to dividing (or filtering) such that an adjusted received signal having a predetermined power is divided into the at least two components. This ensures that original tone signals which are strong signals and echo signals of the original tone signals which are weak signals have the same predetermined power which enables the echo signals to be detected using the same technique as the original tone signals. The power may be adjusted by for example adjusting the amplitude of the received signal.

Figure 4:
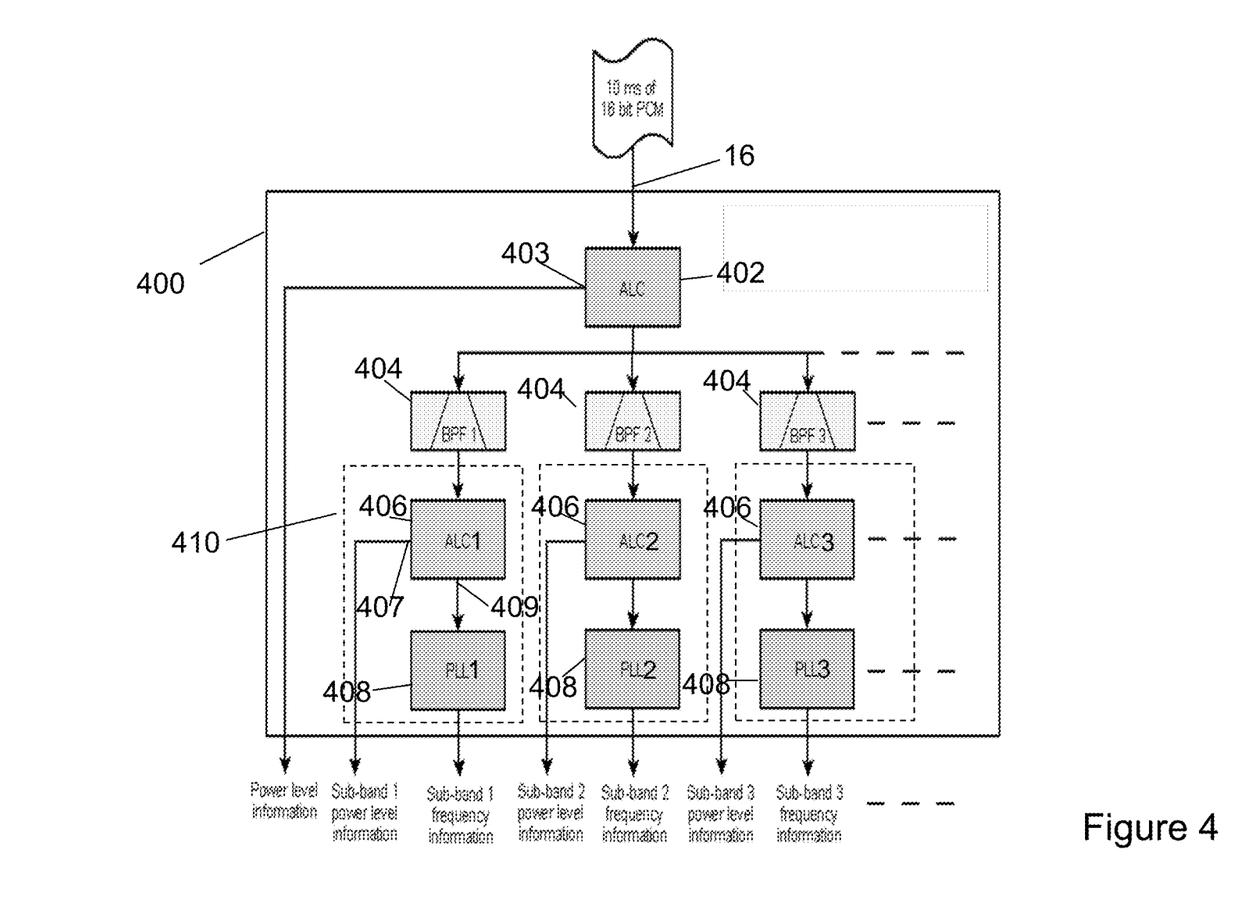
FIGS. 4 and 5 are schematic diagrams illustrating in more detail the method and apparatus for detecting one or more tones in accordance with an embodiment of the disclosure.

In the embodiment shown in FIG. 4, the adjustment block 402 is an Automated Level Control (ALC) block 402 and the received signal at input 16 is coupled to the ALC block 402 which operates to adjust the amplitude of the received signal to a predetermined level. The adjustment may be an amplification or an attenuation of the received signal. An indication of the amount of adjustment made by the ALC block on each received frame is provided at an output 403 of the ALC block as power level information. In an alternative arrangement, an Automatic Gain Control (AGC) block may be used instead. ALC and AGC blocks are well known in the art and so no further details shall be provided herein.

The adjustment provided by the ALC block 402 ensures that irrespective of whether the tone received is a strong one (e.g. high power and amplitude) or an echo (e.g. low power and amplitude) of a tone, the adjusted received signal at the output of the ALC block 402 has the same level of amplitude (power).

An adjusted received signal having a predetermined amplitude at the output of ALC block 402 is then provided to a frequency divider comprising in an embodiment, at least two filters 404. In FIG. 4, three bandpass filters 404 are shown and represented by BF1, BF2, and BF3. The dotted lines in FIG. 4 indicate that more filters 404 may be used. The passbands of the filters BF1, BF2 and BF3 are selected based on the frequencies of the one or more tones that are to be detected so that the received signal is divided into sub-bands for independent processing. The number of filters used depends on the number and frequencies of the different set up signals or tones to be detected. In an embodiment, the number of filters and their passbands are determined by first compiling a list of the different tones to be detected. The list may be generated, at the time of design and/or manufacture, from customer input and/or from looking at the different relevant standards (e.g. ITU-T V.152 provides a list of different fax/modem tones of different standards that might be detected but does not include the non-ITU standards such as Bell or SIA). The different tones in the list are then mapped onto a frequency spectrum to see where there is any frequency overlap. The tones are then classified according to when the tones are expected to be received: for example, according to whether the tones are to be detected on an originator or caller side (e.g. such as a CT tone) or a terminator or answer side (such as a ANSam tone). The aim is to classify the tones so that the frequency spectrum can be divided into different frequency sub bands with no two tones occurring in the same frequency sub band at the same time. For example, so no two caller side tones are in the same frequency band at the same time.

With the three filters BF1, BF2, BF3 shown in FIG. 4 having, for example, the passbands as set out below, 14 different tones or set up signals may be detected. Examples, of the 14 tones that can be detected are also given below.

Example Filter pass bands:
BF3-2000-2400 Hz
BF2-1600-1900 Hz
BF1-900-1500 Hz
Example Tones:
ANS/ANSam—as specified in ITU-T V.25/V.8bis
CT tone—as in ITU-T V.25
V.23 mark frequency—as in ITU-T V.23
V.8 CM and JM—as in ITU-T V.8bis
V.32 AA—as in ITU-T V.32/V.32bis
V.22/V.22bis guard tone—as in ITU-T V.22/V.22bis
Bell 212 answer tone—Bell 212 standard
Bell 103 terminator mark frequency—Bell 103 standard Bell 103 originator mark frequency—Bell 103 standard
SIA handshake tones—as defined in SIA DC02 and SIA DC05 standards
Fax V.21 high channel frequencies—as in ITU-T V.21
Fax V.21 low channel frequencies—as in ITU-T V.21
Fax 1100 Hz tone (CNG)—as in ITU-T T.30
USB1—as in ITU-T V.22/V.22bis In an embodiment, the power level of a tone is used in addition to the frequency to detect and identify the tone in a sub band.

The list of predetermined tones, which in an embodiment includes the original tone and its echo, to be detected, the frequency and power level of each of the predetermined tones to be detected are stored in a look-up table in data memory 14. In addition, the tolerance values for the frequency and power levels of each of the predetermined tones are also stored so that, for example, if a tone is detected as having a frequency which falls within the tolerance value of the frequency of a predetermined tone, then the tone will be detected as the predetermined tone.

If a new tone is to be added to the list of predetermined tones to be detected, the frequency of the new tone is mapped onto the frequency spectrum to see whether there is any frequency overlap with the existing tones. If the new tone falls within the same frequency sub band as another tone, provided that the new tone will not be received at the same time (e.g. one tone is on the caller side and the other tone is on the answer side), then the new tone may be simply added to the list. If the frequency of the new tone does fall within the same frequency sub band and occurs at the same time, then the frequency sub band will have to be divided into two sub bands. This can be achieved by programming of appropriate parameters in the factory or in situ.

It will be appreciated that instead of bandpass filters other types of filters, such as a bank of peaking filters may be used. This might be useful when there are just a few tones in a sub-band to be detected. It will therefore be appreciated that any kind of filtering technique may be used that separates the useful tones from the rest.

An output of each of the filters 404 is coupled to a respective frequency discriminator block 410. Each of the frequency discriminator blocks 410 determines a frequency of the one or more tones present in the sub band of the filtered signal at the output of the respective filter 404. In the embodiment shown in FIG. 4, each discriminator block 410 comprises an adjustment block such as an Automated Level Control (ALC) block 406 and a Phase Locked Loop (PLL) 408. The ALC block 406 operates to adjust the power of the received signal to a predetermined level and the adjustment may be an amplification or an attenuation of the received signal. An indication of the amount of adjustment made by each ALC block 406 is provided at a first output 407 of the ALC block 406 as sub band power level information. A second output 409 of each of the adjustment blocks 406 is coupled to a respective PLL 408. Each of the frequency discriminators shown in FIG. 4 includes an ALC block 406 so as to compensate for any attenuation caused by the respective filter 404 and so as to provide a constant power or amplitude at the input of the respective PLL 408. It will be appreciated that additional information, such as phase, may also be extracted by the PLL 408 for each detected tone in the respective sub band. The implementation of PLLs are well known in the art and no further details are given herein. It will however be appreciated that frequency discriminators other than PLLs may instead be used.

Thus, the output of filter BPF1 is coupled to adjustment block ALC1 having a first output 407 for providing power level information for sub band 1 and a second output 409 coupled to PLL1 408, the output of filter BPF2 is coupled to adjustment block ALC2 having a first output 407 for providing power level information for sub band 2 and a second output 409 coupled to PLL2 408 and the output of filter BPF3 is coupled to adjustment block ALC3 having a first output 407 for providing power level information for sub band 3 and a second output 409 coupled to PLL3 408. The value of the adjustments made by the different adjustment blocks ALC1, ALC2, ALC3 may be different for each adjustment block depending on what tones are present in the different the bands at any given time.

The power level information at the output 407 of each of the ALC blocks 406 and the output of each of the PLLs 408 are coupled to a decision logic block 416 which includes a plurality of sub band decision logic blocks 412. Each of the sub band decision logic blocks 412 corresponds to a respective one of the sub bands. Sub band 1 decision logic block 412 provides an indication that a predetermined tone in sub band 1 has been detected when the frequency of a tone in sub band 1 as determined in PLL1 408 corresponds to the frequency of one of the predetermined tones as listed in the look up table held in data memory 14. In an embodiment, the power level information for sub band 1 provided at the output 407 of the ALC1 block 406 is also used to identify the tone whose frequency has been detected by PLL1 408. So, for example, the frequency of the detected tone in sub band 1 as indicated at the output of the PLL1 408 and the power level of the detected tone as indicated by the output 407 of the ALC1, is compared with the data in the look-up table held in the data memory 14 to see what predetermined tone in the look-up table has the same frequency and power level. If there is a match or at least the detected frequency and power levels are within stated tolerance values of one of the predetermined tones in the look-up table, then the detected tone corresponds to the predetermined tone listed in the look-up table and the sub band 1 decision logic block 412 can indicate that a predetermined tone has been detected. The other sub band decision logic blocks 412 for sub bands 2 and 3 operate in a similar manner.

An output of each of the sub band decision logic blocks 412 and the power level information at the output 403 of ALC block 402 are coupled to an overall decision logic block 414. The overall decision logic block 414 receives tone information from the signal processing block 400 in each of the sub bands and indicates that a detected predetermined tone is valid when the detected predetermined tone satisfies a rule. In an embodiment, the rule includes a list of valid combinations of predetermined tones and in the event the overall decision logic block 414 receives tone information indicating that at least one predetermined tone has been detected, the output of the overall decision logic block 414 indicates the at least one detected predetermined tone is valid when the combination of the at least one detected predetermined tone corresponds to a valid combination. A valid combination may include a predetermined sequence of at least two predetermined tones. The rule(s) are held in the date memory 14. In other words, the overall decision logic block 414 receives tone information from the signal processing block 400 in each of the sub bands and establishes the event (e.g. detection of a valid CT signal) that occurred by matching known detection patterns to the detected sequence of tones.

The processing unit 12 processes the information provided at the output of the overall decision logic block 414 and then sends event triggers to an Application Programming Interface (API) (not shown), if necessary according to the results of the processing. The media gateway unit 2, 20, 200, responds to the event triggers for example by switching modes (e.g. to the VBD mode), or by disabling its internal echo cancellers (not shown).

Since the method and apparatus for detecting one or more predetermined tones in accordance with the disclosure can detect a plurality of different tones, the overall decision logic block 414 is used to ensure that the detected tones meet logical rules so that a switching of modes in the media gateway unit is triggered in response to a correct event. For example, if a fax/modem standard specifies that when a tone A is generated by a caller side or originator data device, a tone B should be generated by an answer side or terminator data device, then the rule held in the data memory will indicate that the combination of tone A with tone B is a valid combination. In the event the tone detection program elements 18 in the media gateway units detect a predetermined tone A and a predetermined tone Y, the overall decision logic block 414 will check the rule and in response will indicate that this combination is not valid and the media gateway units will disregard the detected tones A and Y.

As described briefly above, the media gateway units are thus arranged to switch modes in response to the detection of a particular tone or in response to receiving a switch signal from another media gateway unit. When switching is initiated (i.e. in response to a tone signal or a switch signal) will depend on a particular situation and the ability of the media gateway unit to detect tone signals which is determined by the quality of the media gateway unit itself.

For example, in one case when the caller media gateway unit detects the CT tone signal and it starts sending a switch signal in VBD specific packets to the answer media gateway unit, upon the receiving of the switch signal, the answer media gateway unit will switch to VBD if it hadn't already detected the ANS tone signal on its side. Sometimes, due to the delays in the IP networks, the VBD packets from the caller media gateway unit might arrive after the answer media gateway unit has already detected the ANS tone signal and already switched in VBD. In either case presented here, the fax/modem connection has a high chance of proceeding successfully.

In the case where the caller media gateway unit is just a poor implementation in terms of tone detection (and it does not implement the method in accordance with the present disclosure) and it doesn't detect the CT tone signal, whereas the answer media gateway unit does implement the method in accordance with the present invention, if the echo of the CT signal arriving at the answer media gateway unit is above the detection threshold, the tone detector of the answer media gateway unit in accordance with the present disclosure will discriminate it and it will inform the gateway to switch to VBD. Once the answer media gateway unit has switched, it will start sending a switch signal in VBD specific packets to the caller media gateway unit. Upon the receipt of these VBD packets, the caller media gateway unit will switch to VBD as well. If however the echo of the CT signal arriving at the answer media gateway unit is below the detection threshold, the tone detector in accordance with the disclosure will not detect it. Instead, it will detect the ANS tone signal and it will inform the answer media gateway unit to switch to VBD. Once the answer media gateway unit has switched, it will start sending VBD specific packets to the caller media gateway unit. Upon the receipt of these VBD packets, the caller media gateway unit will switch to VBD as well.

Thus, it will be appreciated from these different cases, the fax/modem connection has many chances of succeeding due to the improved detection method in accordance with the present disclosure. By using the method and apparatus for detecting tone signals in accordance with the disclosure in a media gateway unit, the media gateway unit will be able to achieve very good performances (in terms of connection reliability) even when connected with older or poor implementations of the media gateway units.

The date held in the data memory 14 may indicate that the echo signals of original tones may be ignored.

The operation of the apparatus and method for detecting one or more tones in accordance with the disclosure will now be further described with respect to detecting an example tone, the CT signal (signal 300 in FIG. 3) which CT signal has a frequency of 1300 Hz and a power level of −13 dBm0.

On receipt of a signal including a CT signal, the ALC block 402 will determine that the CT signal is a strong signal and so that only a relatively small (e.g. small compared to an echo signal of the CT tone) amplification of the received signal to the predetermined level is required. The amount of amplification required is provided as power level information at the output 403 of the ALC block 402. The amplified received signal is then provided to the three filters, BPF1, BPF2 and BPF3. The frequency of the CT signal falls within the pass-band of the filter BPF1 and thus a filtered component having an amplitude will be provided at the output of BPF1 whereas the filtered components at the output of the filters BPF2 and BPF3 will have a low (possibly zero) amplitude. The filtered components are then passed through the ALC blocks ALC1, ALC2 and ALC3. The power level information provided at the outputs 407 of the ALC blocks ALC2 and ALC3 will indicate that the filtered components at the outputs of the filters BPF2 and BPF3 have very low power and thus, the decision logic block 416 can ignore the tone information for sub bands 2 and 3 when processing the tone information. ALC1 block 406 amplifies the filtered components at the output of the filter BPF1 and provides power level information at its output 407 indicating that the filtered component amplified by ALC1 block 406 includes a tone in the sub band 1 having a power level of −13 dBm0. The PLL1 then determines that a tone signal at 1300 Hz is present in the filtered component. The frequency information at the output of the PLL1 and the power level information at the output 407 of the ALC1 is provided to the sub band 1 decision logic block 412. The sub band 1 decision logic block 412 looks in the look-up table to see whether a predetermined tone in the table has a frequency of 1300 Hz and a power level of −13 dBm0 and matches the received tone information to a CT signal in the look-up table. The overall decision logic block 414 receives the power level information from the ALC block 402 and the outputs of the sub band decision logic blocks 412 and determines that a CT signal has been detected in sub band 1 but no other tone has been detected in the other sub bands 2 and 3. On checking the rules, the overall decision logic block 414 will then determine that a CT signal on its own is a valid combination and thus, that a valid CT signal has been detected. The valid detection of a CT signal will then be used by the processing unit to trigger an event such as a switch to VBD mode.

Thus, in the example shown in FIG. 3, if the media gateway unit 20 coupled to the originator data device 7 detects the CT signal 300 by means of the method and apparatus for detecting tones in accordance with the disclosure and the media gateway unit 200 coupled to the terminator data device 9 detects the echo 301 of the CT signal 300 by means of the method and apparatus for detecting tones in accordance with the disclosure, the media gateway units 20 and 200 can be switched to a VBD mode in response to the detection of the CT signal 300 and echo 301 of the CT signal 300 respectively quickly before the ANSam signal 302 is received by the media gateway unit 200 so that the ANSam signal 302, the echo 303 of the ANSam signal 302 are received by the media gateway units 20 and 200 in VBD mode before the data transmission starts as represented by 306.

It will be appreciated that for voice calls, the tone detector apparatus and method in accordance with the disclosure will not detect any predetermined tones.

In summary, the present disclosure provides a method and apparatus for detecting one or more tones by dividing the received signal into at least two frequency sub bands, processing the components in the sub bands separately and then using the resulting information from the different subs bands to determine whether one or more valid predetermined tones has been detected. The number and distribution of the of sub bands is dependent on the number and frequency of the tones to be detected. The method and apparatus in accordance with the disclosure thus provides a simple solution to detecting a number of different tones according to different standards quickly (for example 20 ms but in the embodiment described above, the time depends on the how the PLLs 408 and the decision logic block 416 are tuned). By detecting the different predetermined tones quickly, the mode of the media gateway unit can be switched quickly which results in less failed connections.

The known systems, such as that described in U.S. Pat. No. 6,708,146, need much more time to discriminate and detect tones compared to the method in accordance with the present disclosure.

Furthermore, the method and apparatus for tone detection in accordance with the disclosure can detect a tone from its echo and thus, enables in some cases for the media gateway unit to switch modes quicker than in the known arrangements which can only detect the original signals. Furthermore, by being able to detect and switch on echo signals, the method and apparatus for tone detection in accordance with the disclosure can operate anywhere in relation to the echo cancellers on the telephony lines and do not have to rely on the echo cancellers being operational before tone signals can be reliably detected. In some known arrangements, the tone detector is placed behind the echo canceller and the tone detector has to wait for the echo canceller to be operating properly to cancel the echos (between 300-400 ms) before the tone detector can detect the tones. In some cases, this delay is too long and modem data is communicated before the mode of the media gateway unit is switched, which can result in a failed connection.

The method and apparatus in accordance with the present disclosure is able to detect tones that are severely distorted and attenuated and thus, can take account of the subscriber line affects which arise in real-life (e.g. attenuation, crosstalk, noise) which are not considered by the known tone detectors. By using certain signal processing modules (e.g. PLL, BPF, ALC) backed-up by certain rules in the decision logic blocks, the presented apparatus is able to detect certain tones with an SNR as low as 5 dB. The attenuation variation is handled by the ALC blocks. The resilience to cross-talk interference is handled by the PLLs and the sub band decision logic blocks which are able to eliminate false events, resulted from cross-talk.

The method in accordance with the present disclosure therefore enables a large number of different tones to be detected without the need for dedicated arrangements for each tone or family of tones. This provides a flexible, cost effective and robust solution for data communication interworking across networks supporting both data and voice communications.

The media gateway unit may have one or more than one channel for communicating over one or more than one communication link. In the event, the media gateway unit has more than one channel, the media gateway unit includes a tone detection apparatus in accordance with the disclosure for each channel.

The method and apparatus for tone detection in accordance with the disclosure was tested with different modem devices, such as devices supplied by US Robotics, Conexant, Motorola, Copeland according to various ITU, Bell and SIA modem standards and over a number of different subscriber lines such as NULL, ETS12, EIA5, EIA6, EIA7 with the result that 0% false detections were provided.

In the foregoing specification, the invention has been described with reference to specific examples of embodiments of the invention. It will, however, be evident that various modifications and changes may be made therein without departing from the broader scope of the invention as set forth in the appended claims.

It will be appreciated that, insofar as embodiments of the invention are implemented by a computer program, then a storage medium and a transmission medium carrying the computer program form aspects of the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system or processing device. The transmission medium may be a CD-rom, diskette or a data connection, such as a telephone cable or an IP connection.

Figure 5:
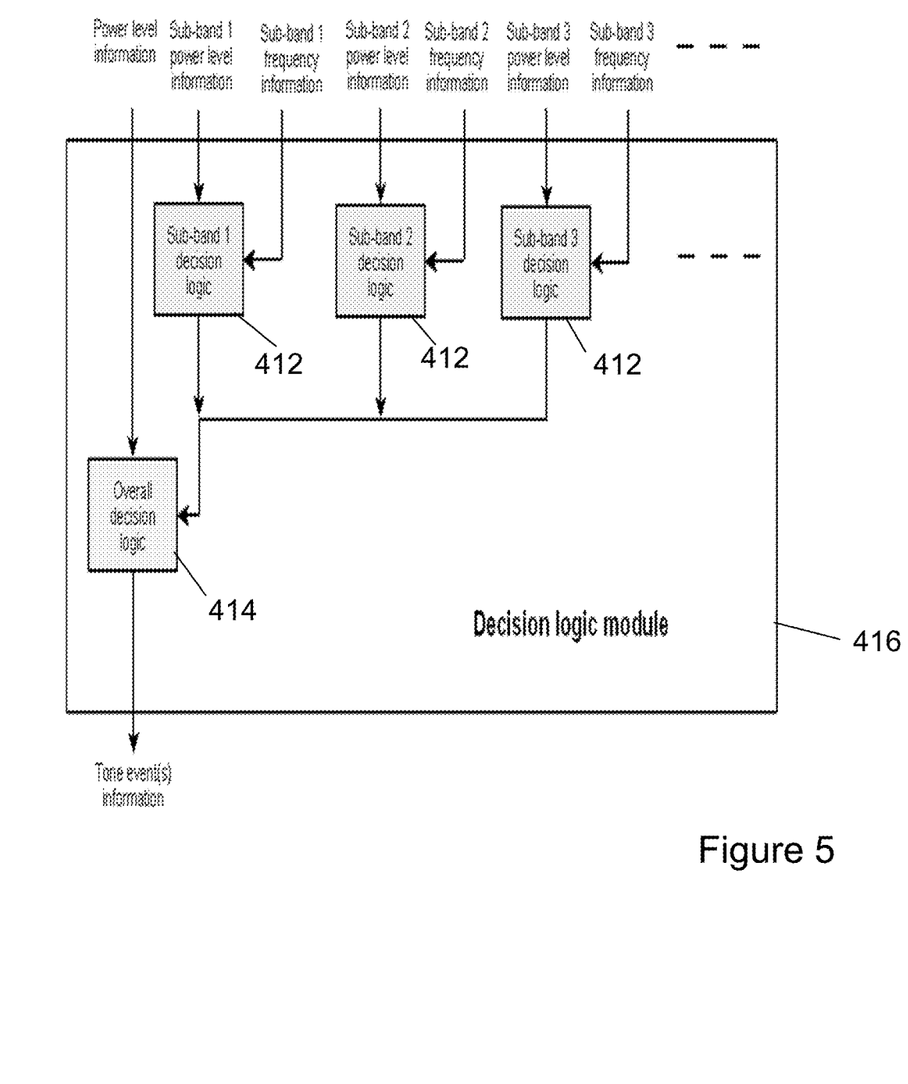

Some of the above embodiments, as applicable, may be implemented using a variety of different processing systems. For example, although FIGS. 4 and 5 and the discussion thereof describe an exemplary system, this exemplary architecture is presented merely to provide a useful reference in discussing various aspects of the invention. Of course, the description of the architecture has been simplified for purposes of discussion, and it is just one of many different types of appropriate architectures that may be used in accordance with the disclosure. Those skilled in the art will recognize that the boundaries between logic blocks are merely illustrative and that alternative embodiments may merge logic blocks or impose an alternate decomposition of functionality upon various logic blocks.

The invention claimed is:

1. A method comprising:
   receiving, at a gateway configured to couple a first network to a second network, a signal transmitted over the first network;
   dividing the signal into two different components, each component being associated with a different frequency sub band, wherein each frequency sub band is selected to include a predetermined frequency of a predetermined tone;
   determining a first frequency of a first tone in a first component;
   determining that the first frequency corresponds to a first predetermined tone; and
   providing a first indication that the first predetermined tone has been detected in response to determining that the first frequency corresponds to the first predetermined tone.

2. The method of claim 1, further comprising:
   switching an operating mode of the gateway in response to the first indication, wherein the operating mode is to provide the signal over the second network.

3. The method of claim 2, wherein the operating mode includes at least one of an encoding mode, a vocoder mode, an echo-canceller mode, and a voiceband data mode.

4. The method of claim 1, further comprising:
   determining that the first predetermined tone satisfies a rule in response to providing the first indication; and
   providing a second indication that the at first predetermined tone is valid in response to determining that the first predetermined tone satisfies the rule.

5. The method of claim 4, wherein:
   the rule includes a list of valid combinations of predetermined tones;
   the method further comprises:
      determining a second frequency of a second tone in a second component;
      determining that the first frequency corresponds to a first predetermined tone;
      determining that a combination of the first predetermined tone and the second predetermined tone corresponds to a valid combination; and
      providing a third indication that the combination satisfies the rule.

6. The method of claim 4, wherein a the valid combination includes a predetermined sequence of at least two predetermined tones.

7. The method of claim 1, wherein in dividing the signal the method further comprises:
   filtering the signal by two filters such that each component is provided at an output of one of the filters, wherein each filter has a passband different from the passband of the other of the filters, and wherein each passband is selected to correspond to one of the frequency sub bands.

8. The method of claim 1, further comprising:
   adjusting a power level of the signal to a predetermined power level.

9. The method of claim 1, further comprising:
   adjusting a power level of each component to a predetermined power level.

10. The method of claim 1, wherein:
    each predetermined tone has a predetermined power level; and
    the method further comprises:
       determining a first power level of the first tone; and
       providing the first indication is in further response to determining that the first power level corresponds to the predetermined power level.

11. The method of claim 1, wherein the first network comprises one of a private branch exchange network, a public switched telephone network, and an Internet protocol network.

12. A gateway comprising:
    a first network interface; and
    an apparatus for detecting predetermined tones transmitted, the apparatus comprising:
       an input to receive a signal transmitted over the first network interface;
       a frequency divider to divide the signal into two different components, each component being associated with a different frequency sub band, wherein each frequency sub band is selected to include a predetermined frequency of a predetermined tone;
       a frequency discriminator to determine frequencies of tones in the components; and
       a decision logic block to provide a first indication that a first predetermined tone has been detected when a first determined frequency of a first tone in a first component corresponds to a first predetermined frequency of the first tone.

13. The gateway of claim 12, further comprising, further comprising:
    a second network interface;
    wherein the apparatus is operable to switch an operating mode of the gateway in response to the first indication, wherein the operating mode is to provide the signal over the second network interface.

14. The gateway of claim 13, wherein the operating mode includes at least one of an encoding mode, a vocoder mode, an echo-canceller mode, and a voiceband data mode.

15. The gateway of claim 12, wherein the decision logic block is further to provide, in response to the first indication, a second indication that the first predetermined tone is valid when the first predetermined tone satisfies a rule, wherein the rule includes a list of valid combinations of predetermined tones.

16. The gateway of claim 15, wherein the decision logic block is further to:
    provide the first indication when a second determined frequency of a second tone in a second component corresponds to a second predetermined frequency of the second tone; and
    provide a third indication when a combination of the first tone and the second tone.

17. The gateway of claim 12, wherein:
    each predetermined tone has a predetermined power level; and
    the apparatus further comprises an adjustment block to determine a power level of tones in the components; and
    the decision logic is to provide the first indication in further response to determining that a first power level of the first tone corresponds to a first predetermined power level.

18. The gateway of claim 12, wherein the first network comprises one of a private branch exchange network, a public switched telephone network, and an Internet protocol network.

19. A method comprising:
    receiving, at a gateway configured to couple a first network (PSTN) to a second network, a signal transmitted over the first network;
    selecting at least two frequency sub bands, the selecting further comprising:
       identifying a plurality of predetermined tones to be detected, each tone having a predetermined frequency;
       mapping the predetermined tones onto a frequency spectrum;
       classifying the predetermined tones by when the tones are expected to be received; and
       dividing the frequency spectrum into frequency sub bands based on the mapping and the classifying, such that no two tones that are expected to be received at the same time have frequencies in the same frequency sub band;
    dividing the signal into the frequency sub bands to provide at least two components of the signal in different frequency sub bands;
    determining a first frequency of a first tone in a first component; and
    providing an indication that a predetermined tone has been detected when the first frequency corresponds to predetermined frequency of the first tone.

20. The method of claim 19, further comprising:
switching an operating mode of the gateway in response to the first indication, wherein the operating mode is to provide the signal over the second network.

\* \* \* \* \*